US012718153B2

(12) United States Patent
Doan Huu

(10) Patent No.: US 12,718,153 B2
(45) Date of Patent: Aug. 25, 2026

(54) SURROGATE MODEL FOR TIME-SERIES MODEL INTERPRETATION

(71) Applicant: SAP IRELAND LIMITED, Dublin (IE)

(72) Inventor: Jacques Doan Huu, Montigny le Bretonneux (FR)

(73) Assignee: SAP IRELAND LIMITED, Dublin (IE)

( * ) Notice: Subject to any disclaimer, the term of this patent is extended or adjusted under 35 U.S.C. 154(b) by 1039 days.

(21) Appl. No.: 17/728,207

(22) Filed: Apr. 25, 2022

(65) Prior Publication Data

US 2023/0342671 A1 Oct. 26, 2023

(51) Int. Cl.
*G06N 20/20* (2019.01)
*G06F 16/9038* (2019.01)
*G06F 18/214* (2023.01)

(52) U.S. Cl.
CPC ......... *G06N 20/20* (2019.01); *G06F 16/9038* (2019.01); *G06F 18/2148* (2023.01)

(58) Field of Classification Search
CPC .... G06N 20/20; G06N 20/00; G06F 16/9038; G06F 18/2148; G06F 16/2474; G06V 2201/03; G06V 10/803; G06V 10/82
See application file for complete search history.

(56) References Cited

U.S. PATENT DOCUMENTS

2018/0060759 A1* 3/2018 Chu ...................... G06N 20/00
2022/0237516 A1* 7/2022 Schmidt ................. G06N 5/022

OTHER PUBLICATIONS

Wang, Tong, and Qihang Lin. “Hybrid predictive models: When an interpretable model collaborates with a black-box model.” Journal of Machine Learning Research 22.137 (2021): 1-38. (Year: 2021).*
Anish, Athul. “Time Series Analysis.” Medium, Nov. 25, 2020, medium.com/swlh/time-series-analysis-7006ea1c3326. (Year: 2020).*
Bergmann, Frank T., et al. “One file to share them all: using the Combine archive and the OMEX format to share all information about a modeling project.” arXiv preprint arXiv:1407.4992 (2014). (Year: 2014).*

(Continued)

*Primary Examiner* — Jennifer N Welch
*Assistant Examiner* — Megan Elizabeth Hwang
(74) *Attorney, Agent, or Firm* — Buckley, Maschoff & Talwalkar LLC

(57) ABSTRACT

Provided is a system and method which build a composite time-series machine learning model including a core model and a debrief model that includes a combination of the core model and a surrogate model. In one example, the method may include executing the plurality of models on test data and determining accuracy values and interpretability toughness values for the plurality models, selecting a most accurate model as a core model based on the accuracy values and select a most interpretable model as a surrogate model from among other models remaining in the plurality of models based on the interpretability toughness values, building a composite model comprising the core model, the surrogate model, and instructions for generating a debrief model for debriefing the core model based on a combination of the core model and the surrogate model, and storing the composite model within the memory.

18 Claims, 8 Drawing Sheets

400

(56) References Cited

OTHER PUBLICATIONS

Bögl, Markus, et al. "Visual analytics for model selection in time series analysis." IEEE transactions on visualization and computer graphics 19.12 (2013): 2237-2246. (Year: 2013).*
Guo, Liang, et al. "The hybrid PROPHET-SVR approach for forecasting product time series demand with seasonality." Computers & Industrial Engineering 161 (2021): 107598. (Year: 2021).*
Lundberg, Scott M., and Su-In Lee. "A unified approach to interpreting model predictions." Advances in neural information processing systems 30 (2017). (Year: 2017).*
Silvestre, Gabriel Dalforno, Moisés Rocha dos Santos, and André CPLF de Carvalho. "Seasonal-trend decomposition based on loess+ machine learning: hybrid forecasting for monthly univariate time series." 2021 international joint conference on neural networks (IJCNN). IEEE, 2021. (Year: 2021).*
Wen, Qingsong, et al. "RobustSTL: A robust seasonal-trend decomposition algorithm for long time series." Proceedings of the AAAI conference on artificial intelligence. vol. 33. No. 01. 2019. (Year: 2019).*
Smyl, Slawek. "A hybrid method of exponential smoothing and recurrent neural networks for time series forecasting." International journal of forecasting 36.1 (2020): 75-85. (Year: 2020).*

* cited by examiner

Figure 1A:
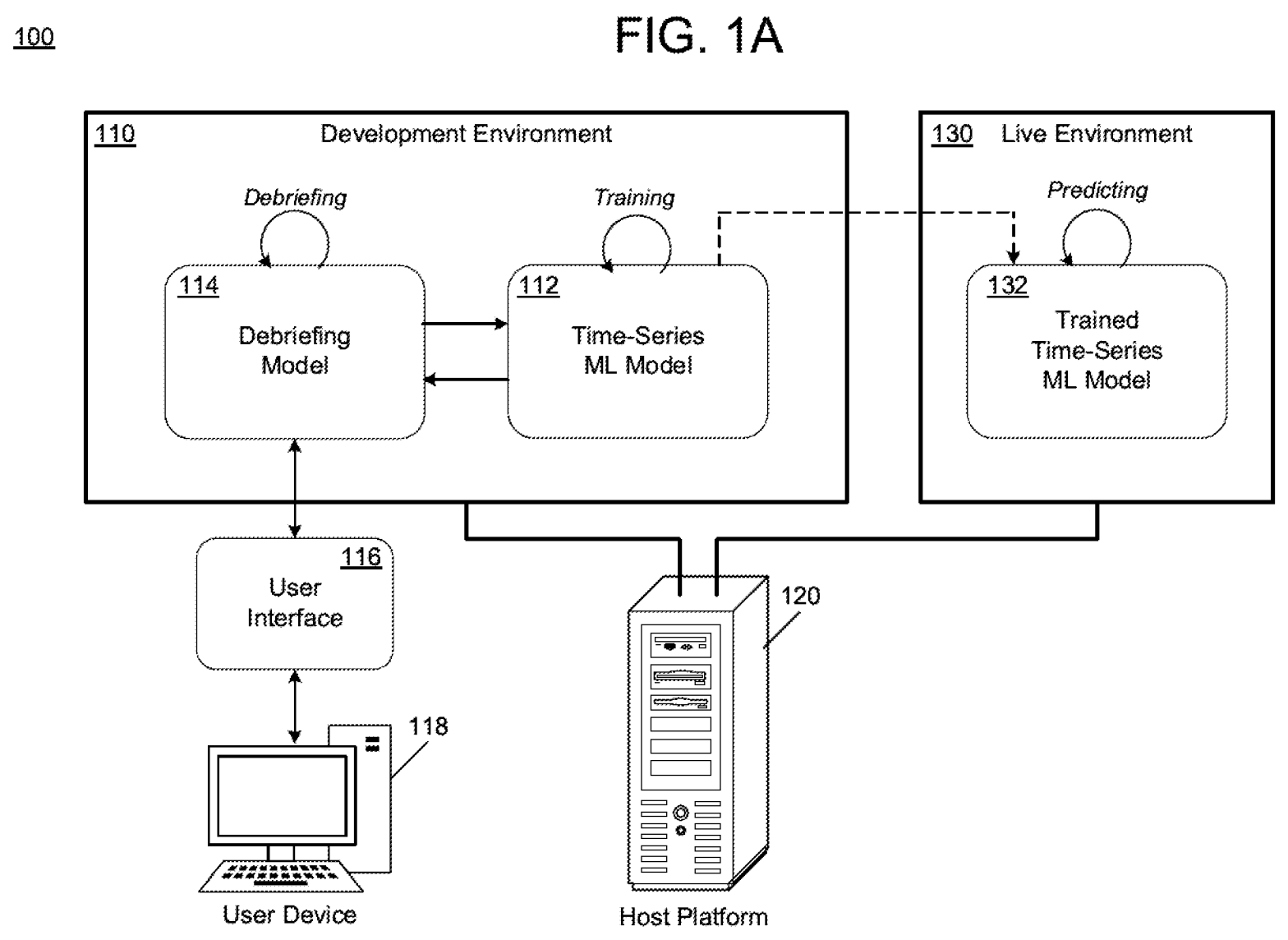

110 Development Environment

114 Debriefing Model

Debriefing

112 Time-Series ML Model

Training

130 Live Environment

132 Trained Time-Series ML Model

Predicting

116 User Interface

118 User Device

120 Host Platform

160

200
210
User Device (Developer)
Test Data 212
220
Test / Score
Host Platform
222
Model Repository
231
232
Predicted Output (Model 1)
Predicted Output (Model 2)
Predicted Output (Model 3)
Predicted Output (Model N)
Interpretability Data (Model 1)
Interpretability Data (Model 2)
Interpretability Data (Model 3)
Interpretability Data (Model N)

260 Model Selector

250 Interpretability User Interface 253 254 255 256 257

| Model | Accuracy | Complexity | ITS | Role |
| --- | --- | --- | --- | --- |
| M1 | 0.97 | 2 | 5 | *Core* |
| M2 | 0.70 | 3 | 8 | |
| M3 | 0.93 | 4 | 2 | *Surrogate* |
| ... | | | | |
| MN | 0.91 | 16 | 4 | |

251

252

310
Host Platform 330
Debrief
334
Debriefing Model
Predict
332
Time-Series Forecasting Model
Surrogate Model
306
Core Model
304
Training Data
336
Debrief Report

400

500

SURROGATE MODEL FOR TIME-SERIES MODEL INTERPRETATION

BACKGROUND

Time-series data contains sequential data points (e.g., data values) that can be observed at successive time durations (e.g., hourly, daily, weekly, monthly, annually, etc.). For example, monthly rainfall, daily stock prices, annual sales revenue, etc., are examples of time-series data. Sensors in combination with machine learning can be used to analyze the time-series data and make predictions. For example, time-series forecasting (or more simply "forecasting") is a machine learning process which can be used to learn from historical values of time-series data and predict future values of the time-series data based on the learning. As an example, a forecasting process may output a graph of time-series data as a plurality of data points over time (linear) that are displayed on a user interface for an analyst or other user to visualize and possibly take actions according to the prediction.

Training a time-series based machine learning model (e.g., a time-series forecasting model, etc.) to accurately make predictions can be a laborious task. One of the limitations to model accuracy is that it requires greater procedure complexity to create a more accurate model (e.g., better fit the time-series data to the model during training, etc.). The complexity makes it difficult for developers to extract explanatory insights on model characteristics during a subsequent debriefing stage of the model and its training attributes. In other words, which aspects of the model are causing which attributes in the predicted output. Because of this, developers often choose to train less complex time-series forecasting algorithms because they can be interpreted easier, but the tradeoff in the lack of complexity is often a lack of predictive accuracy.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1A is a diagram illustrating a computing environment of a host platform which hosts a development environment for developing a machine learning model in accordance with an example embodiment.

FIG. 2B is a diagram illustrating a process of selecting a core model and a surrogate model from among the plurality of models in accordance with an example embodiment.

Figure 1B:
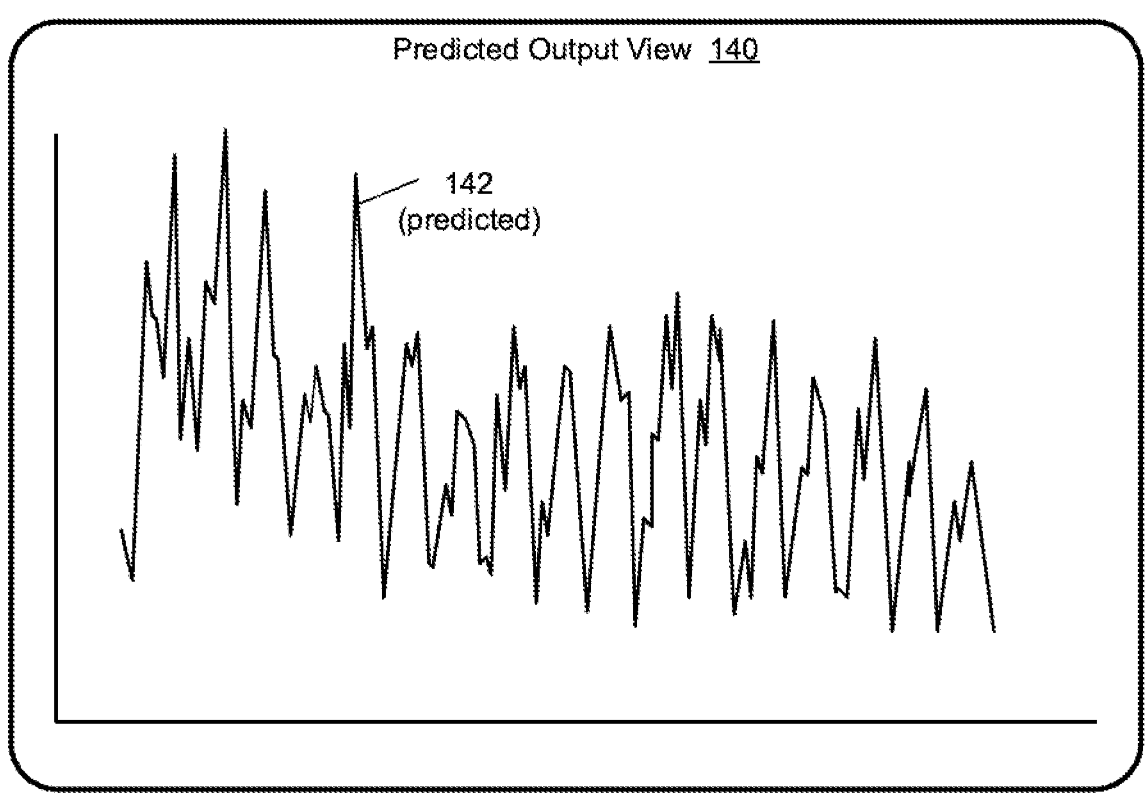
FIG. 1B is a diagram illustrating a view of an output of a debrief process performed on the machine learning model in FIG. 1A in accordance with an example embodiment.
Figure 1B:
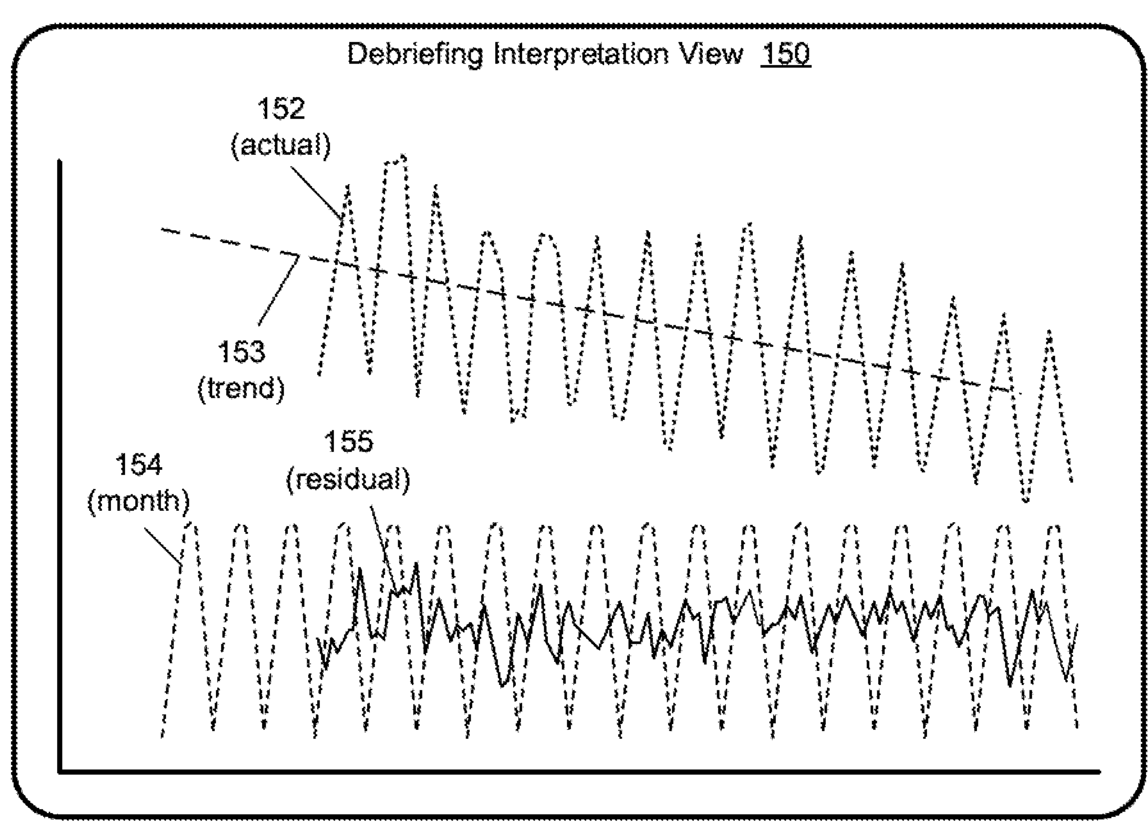

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Time-series forecasting models are machine learning models that are used to predict a single set of values of an item (e.g., cost, quantity, amount, intensity, etc.) in a future period of time which may be recorded over equal time increments (e.g., minutes, days, hours, weeks, years, etc.) on a graph. The data points may then be connected via a wave creating a time-series data signal. The models may include components (parameters, variables, etc.) that represent data attributes that are frequently found in business applications such as trends, seasonality, fluctuations, residuals, and time dependence. Model features may be trained based on available historical data. The trained model can then be used to forecast future values for the data. Some examples of time-series forecasting models include exponential smoothing (ETS) algorithms and autoregressive integrated moving average (ARIMA) algorithms just to name a few.

Machine learning algorithms attempt to optimize both predictive accuracy (greater is better) and complexity (less is better). This optimization is governed by the parsimony principle. Typically, the accuracy of a time-series forecasting model increases with an increase in complexity which can result in over-fitting. To prevent this from occurring, a debrief process may be performed during the training of the model. The debrief process may query the model for information about the training iteration including the model attributes and the predicted output signal. Then, a second model, referred to as a debrief model, is used to identify the contributions of different components of the model on the predicted output signal.

However, debriefing a time-series forecasting model can be difficult. In many cases, a "seasonal" component (e.g., a recurring component) of the machine-learning algorithm which is highly explanatory, may not be accurately identified during a training process where optimization is controlled by model accuracy and model complexity. Therefore, in many cases, a model developer must manually test different models using test data and evaluate the performance of the models and go with a "gut feeling" on the best model to use for debriefing.

The example embodiments are directed to a host system that can overcome the drawbacks in the art and accurately debrief a time-series forecasting model during model training based on a surrogate model (i.e., a surrogate time-series forecasting model). A model selection process performed via the host system may be augmented to include an additional sub-process that determines the interpretability scores for each model being tested. The model that is most accurate (e.g., with a greatest accuracy value, etc.) may be selected as the core model while a model that is most interpretable (e.g., has the lowest or easiest interpretability toughness score, etc.) is selected as the surrogate model. The host system may then generate a composite model (binary file) that includes a first storage for the core model and a second storage for the surrogate model.

The debriefing process may be performed simultaneously with the training of the core model. For example, an iteration of training data may be executed by the core model, thereby training the core model. In addition, a debrief model may be executed and used to interrogate the predicted output signal created by the core model. According to various embodiments, the debrief model is created from a combination of components from the core model (most accurate) and the surrogate model (e.g., easiest to interpret) resulting in a model that is both accurate and capable of creating a highly understandable debriefing of the core model including variable contributions of more interpretable components from the surrogate model.

Prior modeling approaches that rely on "surrogate" models are directed only to classification-based and regression-based models. Meanwhile, the example embodiments expand the use of a surrogate model to the domain of time-series forecasting (i.e., predicting future outputs of a time-series value). In particular, components from a surrogate model may be used to debrief (e.g., query, analyze, and display results, etc.) a core time-series forecasting model. The surrogate model may be selected from a group of other time-series forecasting models that are tested and that have a predictive accuracy that is similar to the core model. Thus, the surrogate model may have a high correlation with the core model, thereby improving the accuracy of the debriefing results.

A debrief model may be created by combining one or more interpretable components from the surrogate model (e.g., a linear component and a seasonal component, etc.) and a residual component that is based on a residual of the core model. In some embodiments, the residual component may include the residual component from the core model. In some embodiments, the residual component may include a difference between the residual component of the core model and the residual component of the surrogate model (i.e., a difference in parameter value, etc.) In doing so, a more interpretable component from surrogate model is introduced into the debriefing model and overall model accuracy is still ensured by including the difference between the core model and surrogate model predicted outputs.

The debrief model may then be executed on the predicted output signal from the core model to identify different components of the core model within the predicted output signal, for example, a trend component, a seasonal component, a residual component, and the like.

According to various embodiments, the host system may create an executable file such as a binary file with a storage area that includes the core model and a different storage area that includes the surrogate model. In addition, instructions for creating the debrief model from the core model and the surrogate model may be embodied within the binary file. For example, the instructions may identify which model is the "core" role and which model is the "surrogate" role as well as how to construct the debrief algorithm/model from the components of the core model and the surrogate model.

FIG. 1A illustrates a computing environment 100 of a host platform 120 which hosts a development environment 110 for developing a machine learning model in accordance with an example embodiment. In addition, the host platform 120 may also host a live environment 130 (productive environment) which is accessible to remote devices via an Internet address such as a URL, IP address, etc. The development environment 110 may include an Integrated Development Environment (IDE) that allows software code embodying a machine learning model 112 such as a time-series forecasting model to be built and trained via execution of the machine learning model 112 on training data.

In the example of FIG. 1A, the machine learning model 112 is being developed/trained within the development environment 110. The process may include a training data set or sets (not shown) being input or otherwise uploaded to the host platform 120. In response, the host platform 120 may execute the machine learning model 112 and also execute a debriefing model 114 to debrief the machine learning model 112 while it executes. For example, the debriefing model 114 may query the machine learning model 112 for its predicted output as well as information about the model (e.g., name, algorithm, etc.), the training data (e.g., an identifier of the training data set or sets), and the like. The debriefing model 114 may identify variable contributions of each of the variables within the machine learning model 112 and output the variable contributions via a user interface 116.

The variable contributions may be determined by executing the debriefing model 114 on the queried data from the machine learning model 112 including the predicted output and determining contributions of a trend component, a seasonal component, a residual component, and the like, of the algorithm within the machine learning model 112. For example, the debriefing model 114 may identify a seasonal component of the machine learning model 112 based on a seasonal component from a surrogate model, examples of which are further described herein. A user, such as a developer, may view the debrief results output from the debriefing model 114 via the user interface 116 which may be hosted via a website, a mobile application, a progressive web application, or the like. For example, the developer may access the website or application associated with the development environment 110 via a user device 118 such as a personal computer, a tablet, a laptop, or the like.

When the model has been fully trained and the developer is satisfied, a trained machine learning model 132 may be instantiated in the live environment 130 for making predictions on raw/new data is it is fed to the system.

FIG. 1B illustrates a view 160 of an output of a debrief process performed on the machine learning model 112 via the debriefing model 114 in FIG. 1A, in accordance with an example embodiment. Referring to FIG. 1B, the view 160 may be part of a larger dashboard that is not shown and that includes additional debriefing information determined about the machine learning model 112 including model name, type, algorithm, training data information, iteration information, and the like. The view 160 in this example includes a predicted output view 140 that shows a predicted output signal 142 (e.g., waveform signal, etc.) output by the machine learning model 112.

Here, the predicted output signal 142 may include a graph that shows changes to the predicted value of a time-series data value (e.g., cost, quantity, number, temperature, pressure, velocity, etc.) over time. In this example, the predicted output signal 142 corresponds to a future point in time that has yet to occur. The machine learning model 112 may predict the behavior of the data based on historical patterns of the data learned via many training iterations within the development environment 110 of FIG. 1A, and output the predicted output signal 142 representing the predicted behavior.

In addition, the view 160 also includes a debriefing interpretation view 150 of the predicted output signal 142. The debriefing interpretation view 150 may also be embodied as a graph of multiple signals (waveforms) that are identified by the debriefing model 114 from the predicted output signal 142. Here, the debriefing interpretation view 150 includes an actual or measured output signal 152 (that subsequently occurs and that is measured not predicted), a trend signal 153 of the predicted output signal 142, a monthly signal 154 (also referred to as repeating, continuous, recurring, etc.) of the predicted output signal 142, and a residual component 155 of the predicted output signal 142. Each of the different signals may be shown in different colors or shading to make them easier to visualize. In addition, the predicted output signal 142 shown in the predicted output view 140 may also be overlaid on the waveforms in the debriefing interpretation view 150, but is not in this example for clarity. Here, the signals are overlayed on top of each other within the debriefing interpretation view 150 but it should also be appreciated that the contributions may be displayed as individual signals that are not overlaid on one another or not in graph form at all, for example, via numerical values or the like.

According to various embodiments, the debriefing model described herein, such as the debriefing model 114 in FIG. 1A, may be built within the development environment while training a core machine learning model. The debriefing model may be based on a surrogate model that may be selected based on an interpretability value/score of the surrogate model with respect to other possible/available models. The interpretability value may be created during a model selection process (e.g., when a user provides test data, etc.). That is, a traditional model selection phase of a development process may be expanded to include an additional algorithm/metric that determines an interpretability value of each model based on the testing results of the model.

For example, the host platform may store a group of time-series based machine learning models (forecasting models). The host platform may execute each of them on the test data and compare the results to expected outputs (which may also be included in the test data). The host may then identify a most accurate model and select it as a core model. The host may also identity a most interpretable model (e.g., with the lowest or easiest interpretability value/score and select that as the surrogate model. The combination of the surrogate model and the core model may be used to create a debriefing model that is both highly interpretable and highly accurate.

Figure 2A:
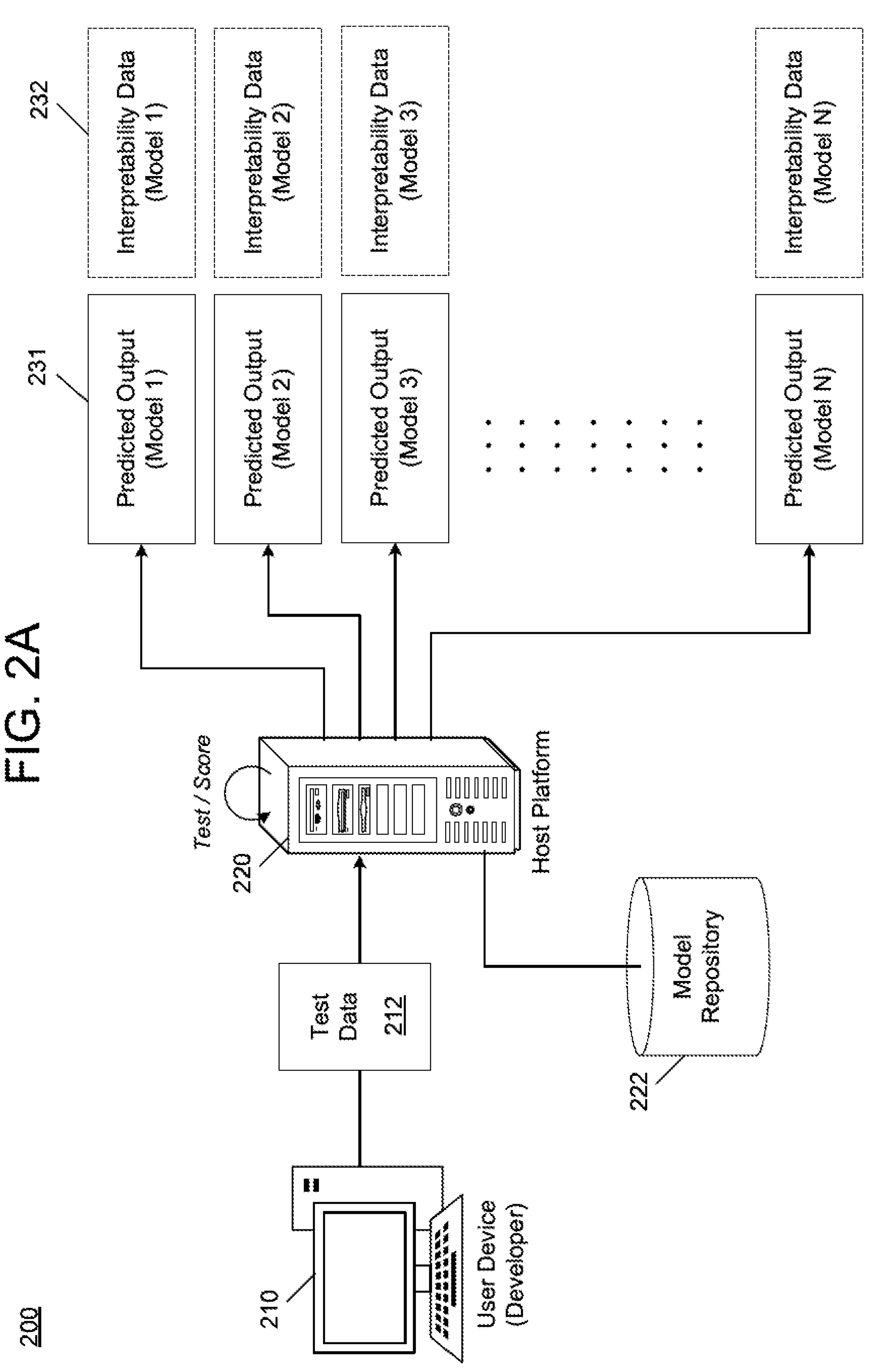
FIG. 2A is a diagram illustrating a process of executing a plurality of models on test data in accordance with an example embodiment.

FIG. 2A illustrates a process 200 of executing a plurality of models on test data in accordance with an example embodiment. The plurality of models may include a plurality of time-series forecasting models with different algorithm components. For example, the algorithms may be different on linear component, lag, seasonal component, residual component, model type, and the like. Below is an example of four time-series forecasting models that can be used in the example of FIG. 2A:

$$M1=\text{Lag+Seasonal+Autoregression}$$

$$M2=\text{Linear Piecewise Linear+Seasonal}$$

$$M3=\text{Lag+Autoregression}$$

$$MN=\text{Double Exponential Smoothing}$$

In this example, the plurality of models may be stored within a model repository 222 that is controlled or otherwise accessible to the host platform 220. A user, such as a developer, may desire to build a machine learning model. Here, the user may upload test data 212 to the host platform 220 via a user device 210 which may access a portal, website, etc., hosted by the host platform 220 to provide the data. As another example, the test data 212 may already be stored at the host platform 220 and the user device 210 may just identify the data to be used for testing. The test data 212 may include input data to be used as an input into a model which causes the model to create a predicted output. The test data 212 may also include expected outputs so that the host platform 220 can compare the predicted results generated by the model from the test data 212 and the expected results to determine an accuracy of the model.

Furthermore, in the example embodiments, the host platform 220 may also perform an interpretability score (ITS), also referred to herein as an interpretability toughness value that is based on a complexity of the model. The interpretability toughness value that is output may represent a difficulty for a human to understand the underlying structure of the time series model. The lower the interpretability toughness score the lower the complexity, and the better the interpretability. In some embodiments, the interpretability value may even be a negative value if the model helps improve the interpretation of the model with respect to a threshold improvement: for example, assigning a negative interpretability score makes sense for linear trend and seasonal components as they bring to the model developer understandable insights on the underlying structure of the model. In some embodiments, the complexity of the model is the interpretability value at default. The default value may be changed based on the model developer subjective estimate.

In FIG. 2A, the host platform 220 creates separate predicted outputs for each model from among a plurality of time-series forecasting models. As an example, the host platform 220 may offer a catalog or a library of predefined models that can be used by a developer to perform training for a particular task. The user may provide a list of models that the user wants to test or the host platform may automatically recommend or provide the list of models based on a type of business task which may be input via a user interface and uploaded to the host platform 220. For example, the host platform 220 may create a predicted output 231 and interpretability data 232 for each model from among the plurality of models. The interpretability data 232 may include a complexity value, an interpretability score, an accuracy value (accuracy of the predicted outputs made by the model) which may be determined by comparing simulated outputs of the machine learning model to actual data of the time-series value over time.

FIG. 2B illustrates a process 240 of displaying a user interface 250 with interpretability data and selecting a core model and a surrogate model from among the plurality of models in accordance with an example embodiment. Referring to FIG. 2B, the host platform 220 shown in FIG. 2A may generate the user interface 250 with rows (e.g., such as rows 251 and 252, etc.) that represent models and columns (e.g., such as columns 253, 254, 255, 256, and 257, etc.) for different attributes of machine learning models. For example, each model may have its own row in the table shown in the user interface 250 and each attribute of the model may include its own column in the table.

In this example, the column 253 corresponds to the model identifier or model name that may be assigned to a particular model. The column 254 corresponds to a predictive accuracy of a respective model. This may be determined by comparing the predicted output from the model with expected outputs provided within the test data 212. The column 255 corresponds to a complexity of the model which may be predefined. The column 256 corresponds to an interpretability toughness score (ITS) that represents how difficult it is for a human to interpret the results of the model, and the column 257 identifies which models the system has selected.

In this example, a model selector 260 sub-process of the example embodiments may select a model that is most accurate as a core model (i.e., the model to be trained). In this example, the model at row 251 is the most accurate model and is selected as the core model. An identifier of the selection is displayed within a cell of the column 257 mapped to the row 251. Furthermore, the model selector 260 may select a model that is most interpretable (i.e., a model with the lowest complexity or ITS) as a surrogate model. Here, the model at row 252 is the least complex and is selected as a surrogate. The components of the surrogate model may not be used to perform live predictions. Instead, the components of the surrogate model may be used to debrief (interpret) the predictions made by the core model.

A time-series model is usually additive and can be decomposed into a sum of components including, for example, a linear trend, a seasonal trend, an auto regressive process, and the like. The ITS value of a time-series model is based on the sum of the individual ITS value of its components. A component ITS value is by default set to its intrinsic complexity value, but it can be changed by the model developer based on his intuitive estimate of the interpretability difficulty which is a subjective human concept. In some embodiments, a component's ITS value can be negative, for example, if the developer believes the component brings human understandable insights on the model. Consequently, adding a component into the time-series model during the training process may decrease the ITS value whereas the additive complexity will increase. This illustrates the divergence between the complexity and the ITS concepts: complexity and accuracy are still the criteria to select the core model delivering the most accurate prediction. In the examples herein, the ITS value can be decorrelated from the complexity value based on model developer changes and be evaluated apart from the core model as the surrogate model which has close accuracy to the core model.

In some embodiments, a user may input commands via a user interface to select the core model and the surrogate model. As another example, the host platform 220 may automatically select the core model and the surrogate model and display the selections via the user interface 250 with an option for the user to confirm the auto-selections. Using the core model, the host platform 220 can make a prediction on training data that is used to train the model. In addition, a debriefing model created from a combination of the core model and the surrogate model can be used to interrogate the predicted output and the core model to generate a debriefing report such as shown in the view 160 of the example of FIG. 1B.

Figure 3A:
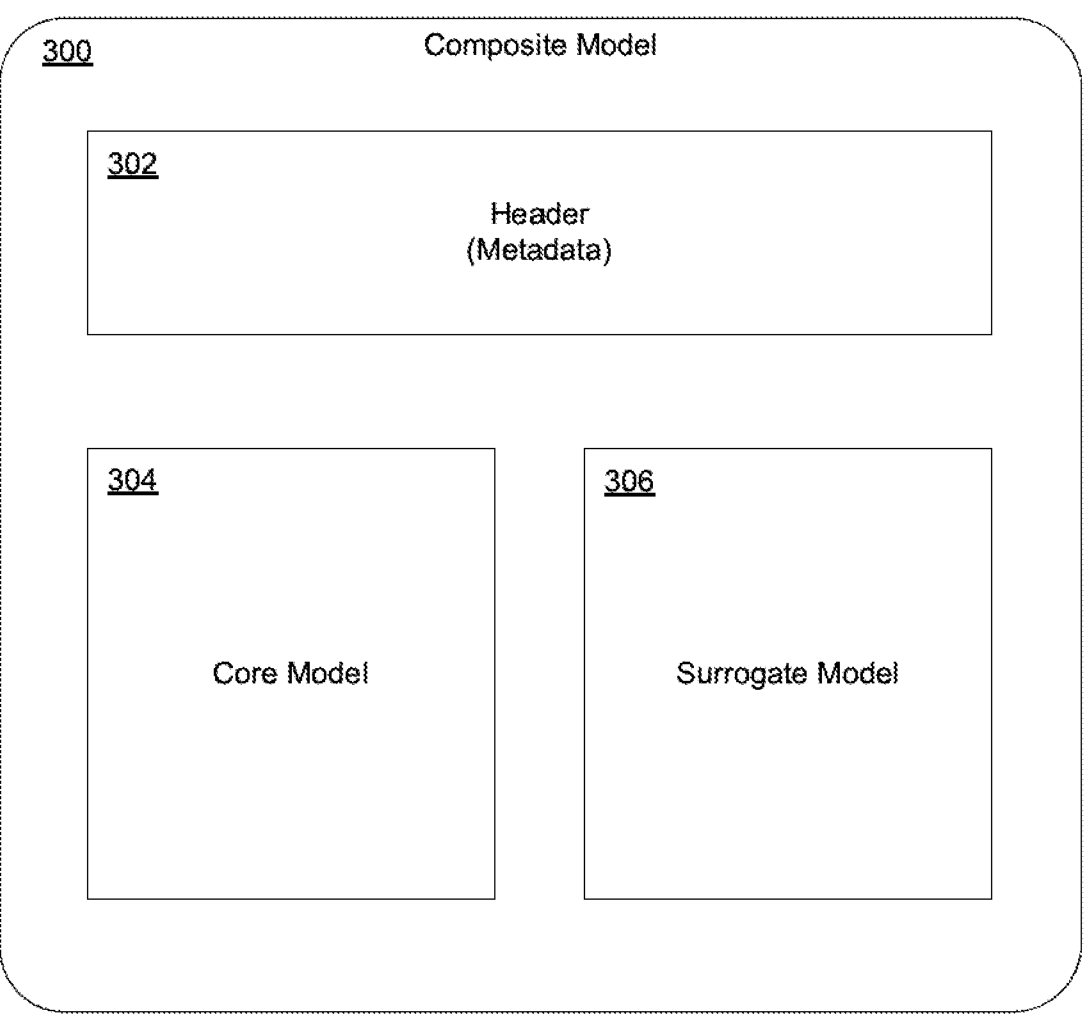
FIG. 3A is a diagram illustrating an example of a composite model generated in accordance with example embodiments.

FIG. 3A illustrates an example of a composite model 300 generated in accordance with example embodiments. Referring to FIG. 3A, the composite model 300 may be embodied as a binary file or other executable that includes a storage area 304 that holds code for executing the core model and a storage area 306 that holds code for executing the surrogate model. The composite model 300 may also include a header 302 or metadata area which storage area/model corresponds to the core model and which storage area/model corresponds to the surrogate model. For example, a "role" identifier may be added to the header 302 which identifies a role of each model. In addition, the header 302 may include instructions on how to create the debrief model from the combination of the core model and the surrogate model.

As an example, a time-series forecasting model may include three components including a trend component, a seasonal component, and a residual component. These three components combine to make one signal output. The instructions may identify which components (from which of the two models) to use to create the debriefing model. In one example, the debriefing model may be created by combining the trend component (or linear component) from the surrogate model, the seasonal component from the surrogate model, and the residual component from the core model. As another example, the residual component may be created based on a difference between the predicted outputs of the core model and the surrogate model.

However, the debrief process can identify the contribution of each of these three components and display that information with the predicted output signal to allow the developer to easily understand what parts of the model are causing the changes to the predicted output.

Figure 3B:
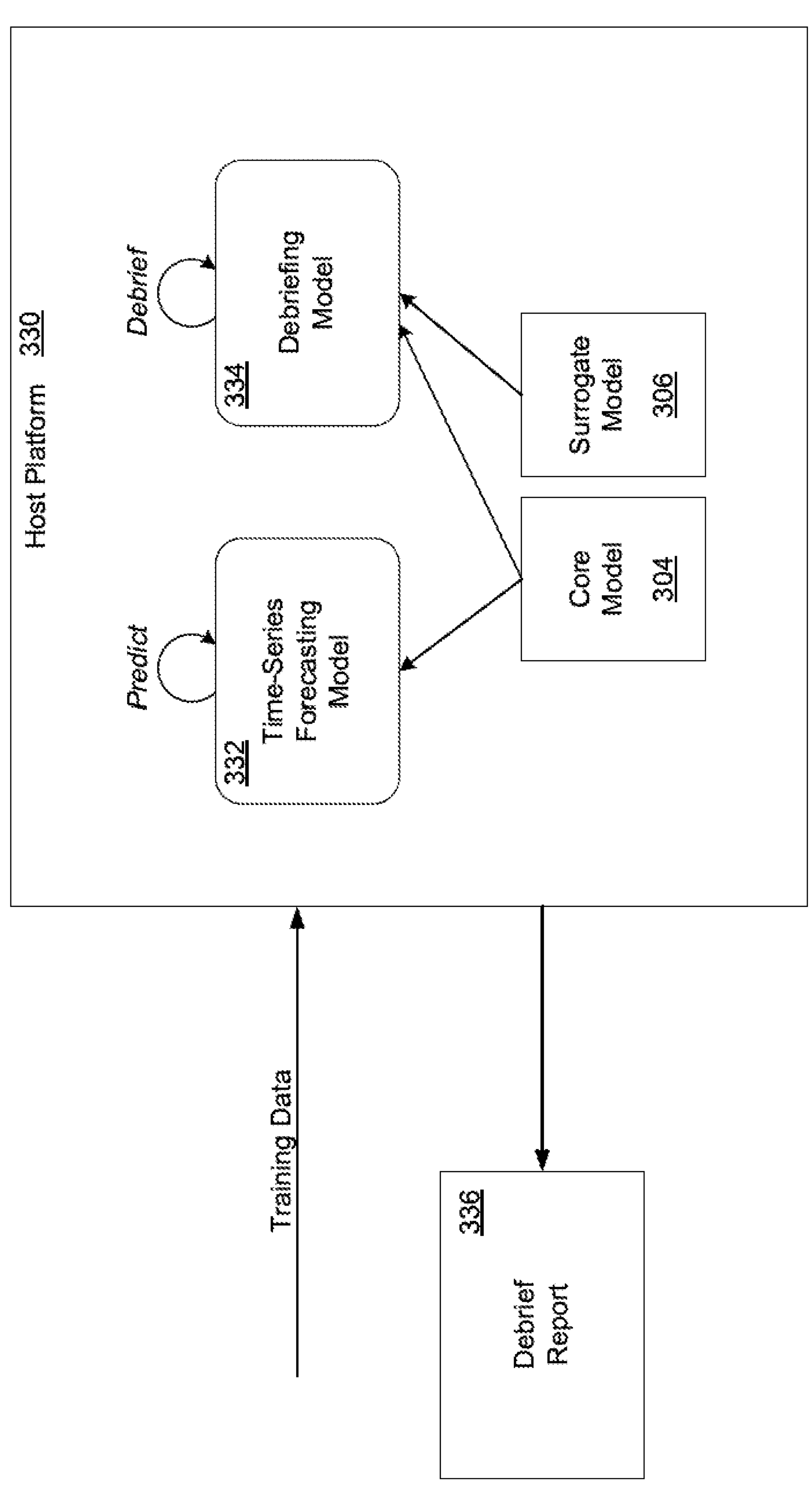
FIG. 3B is a diagram illustrating a process of training and debriefing a time-series machine learning model in accordance with example embodiments.

FIG. 3B illustrates a process 310 of a host platform 330 training a time-series forecasting model 332 and debriefing the time-series forecasting model 332 via a debriefing model 334 in accordance with example embodiments. The time-series forecasting model 332 may be trained based of training data that is iteratively input to the time-series forecasting model 332 in small tables. Each iteration of the training via the host platform 330 updates the time-series forecasting model 332 based on an additional subset of new training data. In this example, a single iteration of training is performed, but the same process may be performed at each iteration of the training as well as at predefined iterations, upon request via a user interface, or the like.

Referring to FIG. 3B, a developer may request to train a model (e.g., the time-series forecasting model 332). Here, the time-series forecasting model 332 may correspond to the core model (e.g., stored in the storage area 304 in FIG. 3A). The time-series forecasting model 332 may be deployed/instantiated within a runtime environment provided by the host platform 330 and made accessible to the developer via a user interface and the Internet. The developer may enter or otherwise submit training data including a new table of training data which is fed to the host platform 330. In response, the host platform 330 executes the time-series forecasting model 332 to make a prediction based on the new table of training data. The predicted output is then analyzed by the debriefing model 334 to generate a debrief report 336. An example of the content that can be included in a debrief report are shown in FIGS. 1B, 2B, and the like.

In the example embodiments, the debriefing model is created based on a combination of the core model and the surrogate model included within the composite model 300. That is, rather than perform a prediction using the core model and then perform a debrief using the surrogate model, the example embodiments perform the debrief using a combination of components of the core model and the surrogate model to obtain the benefits of accuracy of the core model and the benefits of interpretability of the surrogate model.

Figure 4:
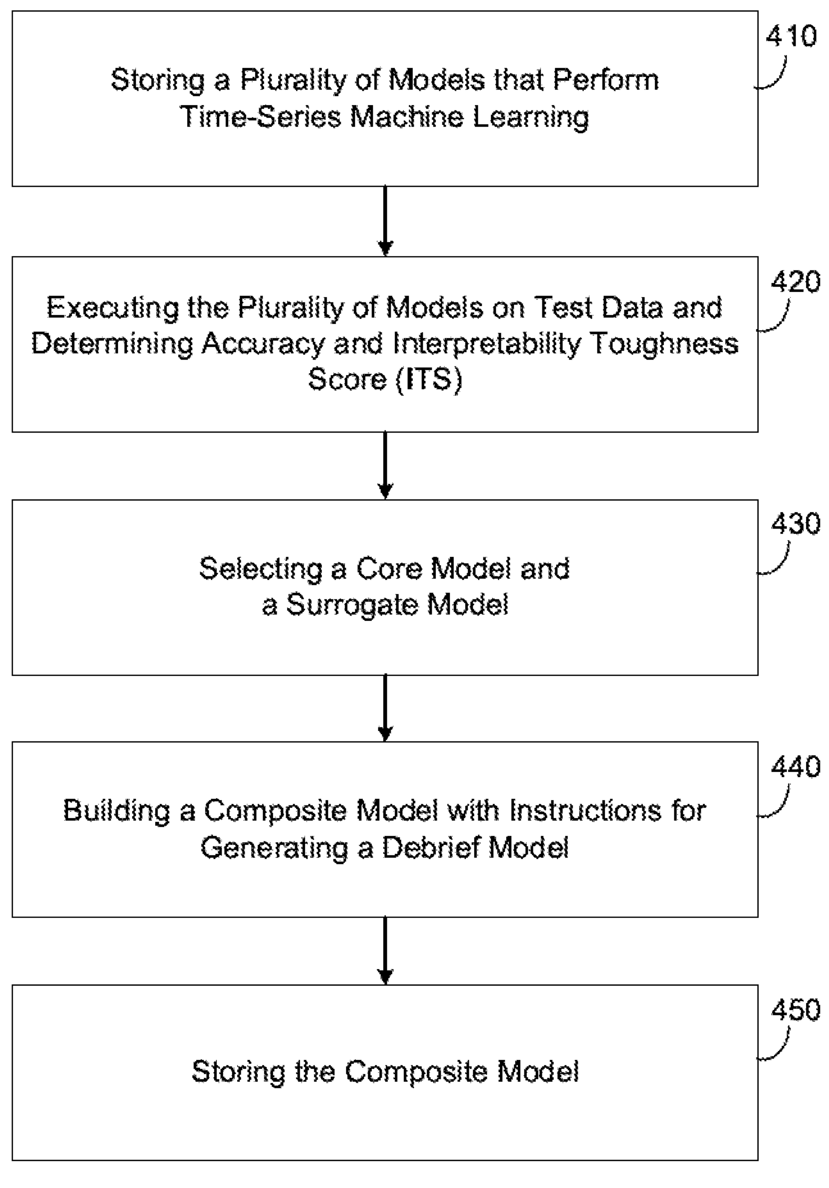
FIG. 4 is a diagram illustrating a method of generating a composite model from historical data of a time-series data set in accordance with an example embodiment.

FIG. 4 illustrates a method 400 of generating a composite debrief model from historical data of a time-series data set in accordance with an example embodiment. For example, the method 400 may be executed by a cloud platform, a web server, a database node, a user device such as a mobile phone, tablet, laptop, personal computer, etc., a combination of devices/nodes, or the like. Referring to FIG. 4, in 410, the method may include storing a plurality of models that perform time-series machine learning based on a plurality of different algorithms, respectively. Each model may include a time-series based machine learning model (e.g., a timer-seasonality, series forecasting model) which include different algorithms with different parameters based on lag, residuals, trends, and the like.

In 420, the method may include executing the plurality of models based on test data and determining accuracy values and interpretability toughness values for the plurality models. In 430, the method may include selecting a core model (e.g., a most accurate model, etc.) from among the plurality of models based on the accuracy values and selecting a surrogate model (e.g., a most interpretable model) from among the remaining models that are left in the plurality of models after the core model has been removed based on the interpretability toughness values. In other words, the system attempts to select the model with the lowest or easiest interpretability toughness value as the surrogate model. In 440, the method may include building a composite model comprising the core model, the surrogate model, and instructions for generating a debrief model for debriefing the core model based on a combination of the core model and the surrogate model. If, however, that model is also the model with the greatest accuracy value, then the system may not use a debriefing model but may simply select the core model as the model for both learning and debriefing. In 450, the method may include storing the composite model within the memory.

In some embodiments, the method may further include receiving a request to train the core model including an iteration of training data, and executing the core model based on the iteration of training data to generate a predicted output signal. In some embodiments, the method may further include instantiating the debrief model, determining, via the debrief model, variable contributions of different components of the core model with respect to the predicted output signal, and displaying, via a user interface, signals of the variable contributions of the different components of the core model. In some embodiments, the determining the variable contributions may include querying the core model via the debrief model to identify the variable contributions of the different components of the core model.

In some embodiments, the building the composite model may include building a file that comprises a first binary storage with the core model, a second binary storage with the surrogate model, and a header with instructions for building the debrief model from a combination of the core model and the surrogate model. In some embodiments, the header may include instructions which identify a role of the core model and a role of the surrogate model. In some embodiments, the instructions for generating the debrief model may include instructions for combining a trend component and a seasonal component from the surrogate model with a residual component from the core model to generate the debrief model. In some embodiments, the selecting may include auto-selecting a model with a greatest accuracy value as the core model and a model with a lowest interpretability toughness value as the surrogate model.

Figure 5:
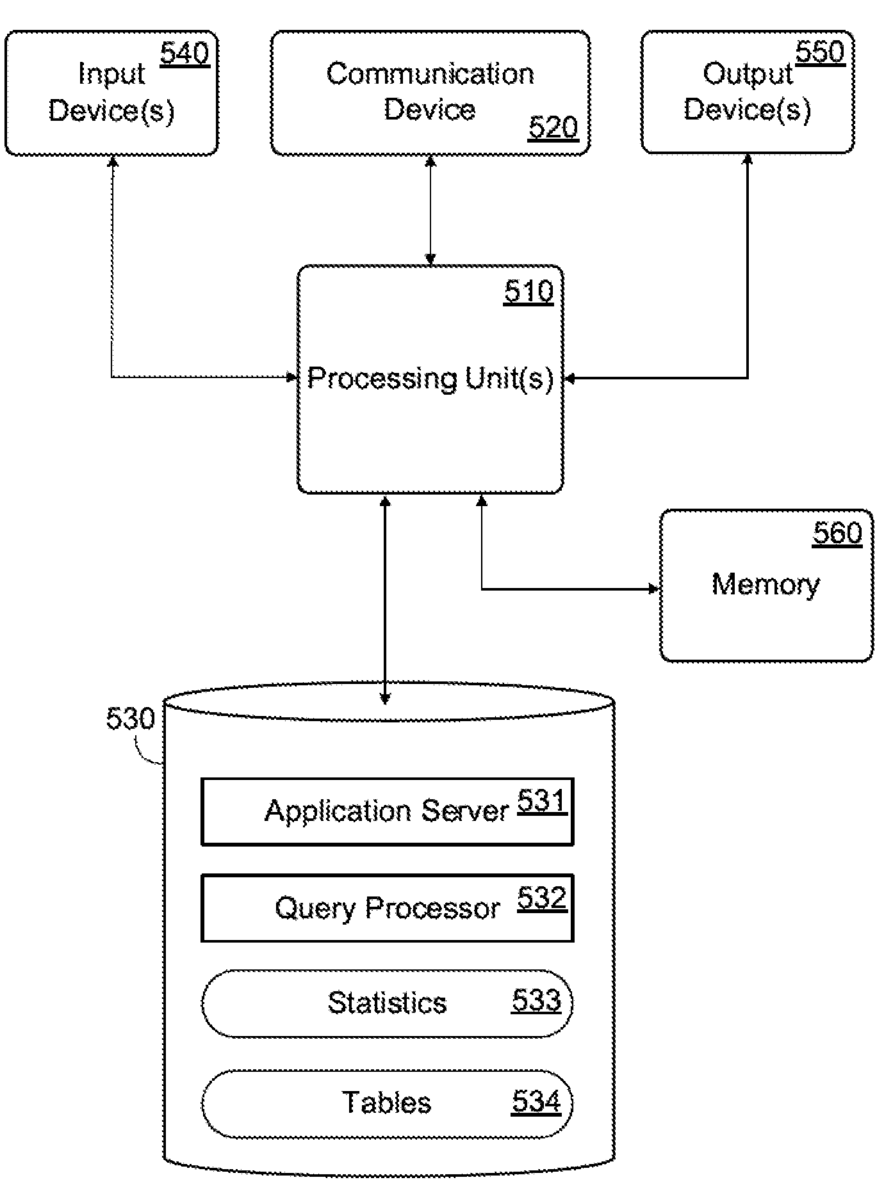
FIG. 5 is a diagram illustrating a computing system for use in the examples herein in accordance with an example embodiment.

FIG. 5 is a diagram of a server node 500 according to some embodiments. The server node 500 may include a general-purpose computing apparatus and may execute program code to perform any of the functions described herein including the process of building a composite model and deploying the composite model within a productive/live environment. In some embodiments, the server node 500 may comprise an implementation of a remote terminal or a host platform. It should also be appreciated that the server node 500 may include other elements according to some embodiments and may not include all of the elements shown in FIG. 5.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM). In some embodiments, the data storage device 530 may store user interface elements in tabular form. For example, one or more columns and one or more rows of user interface elements may be displayed in a two-dimensional spreadsheet, table, document, digital structure, or the like.

Application server 531 and query processor 532 may each comprise program code executed by processing unit(s) 510 to cause server node 500 to perform any one or more of the processes described herein. Such processes may include estimating selectivities of queries on tables 534 based on statistics 533. Embodiments are not limited to execution of these processes by a single computing device. Data storage device 530 may also store data and other program code for providing additional functionality and/or which are necessary for operation of server node 500, such as device drivers, operating system files, etc As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

a memory configured to store a plurality of models that perform time-series machine learning based on a plurality of different algorithms, respectively; and a processor coupled to the memory and configured to:

execute the plurality of models based on test data and determining accuracy values and interpretability toughness values for the plurality of models;

select a most accurate model from among the plurality of models as a core model based on the accuracy values and select a most interpretable model from models remaining among the plurality of models as a surrogate model based on the interpretability toughness values;

build a composite model comprising the core model, the surrogate model, and instructions for generating a debrief model for debriefing the core model by combining a trend component and a seasonal component from the surrogate model with a residual component from the core model to generate the debrief model;

generate the debrief model, based on the instructions, by combining the trend component and the seasonal component from the surrogate model with the residual component from the core model;

execute the generated debrief model to determine variable contributions of each of a plurality of variables of one or more of the plurality of models;

initiate presentation of the determined variable contributions on a user interface; and store the composite model within the memory.

2. The computing system of claim 1, wherein the processor is further configured to receive a request to train the core model including an iteration of training data, and execute the core model based on the iteration of training data to generate a predicted output signal.

3. The computing system of claim 2, wherein the processor is further configured to instantiate the debrief model, determine, via the debrief model, variable contributions of different components of the core model with respect to the predicted output signal, and display, via a user interface, signals of the variable contributions of the different components of the core model.

4. The computing system of claim 3, wherein the processor is configured to query the core model via the debrief model to identify the variable contributions of the different components of the core model.

5. The computing system of claim 1, wherein the processor is configured to build a file that comprises a first binary storage with the core model, a second binary storage with the surrogate model, and a header with instructions for building the debrief model from a combination of the core model and the surrogate model.

6. The computing system of claim 5, wherein the header comprises instructions which identify a role of the core model and the surrogate model.

7. The computing system of claim 1, wherein the processor is configured to auto-select a model with a greatest accuracy value as the core model and auto-select a model with a lowest interpretability toughness value as the surrogate model.

8. A method comprising:

storing a plurality of models that perform time-series machine learning based on a plurality of different algorithms, respectively;

executing the plurality of models based on test data and determining accuracy values and interpretability toughness values for the plurality of models;

selecting a most accurate model from among the plurality of models as a core model based on the accuracy values and selecting a most interpretable model from among other models remaining in the plurality of models as a surrogate model based on the interpretability toughness values;

building a composite model comprising the core model, the surrogate model, and instructions for generating a debrief model for debriefing the core model by combining a trend component and a seasonal component from the surrogate model with a residual component from the core model to generate the debrief model;

generating the debrief model, based on the instructions, by combining the trend component and the seasonal component from the surrogate model with the residual component from the core model;

executing the generated debrief model to determine variable contributions of each of a plurality of variables of one or more of the plurality of models;

initiating presentation of the determined variable contributions on a user interface; and storing the composite model within memory.

9. The method of claim 8, wherein the method further comprises receiving a request to train the core model including an iteration of training data, and executing the core model based on the iteration of training data to generate a predicted output signal.

10. The method of claim 9, wherein the method further comprises instantiating the debrief model, determining, via the debrief model, variable contributions of different components of the core model with respect to the predicted output signal, and displaying, via a user interface, signals of the variable contributions of the different components of the core model.

11. The method of claim 10, wherein the determining the variable contributions comprises querying the core model via the debrief model to identify the variable contributions of the different components of the core model.

12. The method of claim 8, wherein the building the composite model comprises building a file that comprises a first binary storage with the core model, a second binary storage with the surrogate model, and a header with instructions for building the debrief model from a combination of the core model and the surrogate model.

13. The method of claim 12, wherein the header comprises instructions which identify a role of the core model and a role of the surrogate model.

14. The method of claim 8, wherein the selecting comprises auto-selecting a model with a greatest accuracy value as the core model and a model with a lowest interpretability toughness value as the surrogate model.

15. A non-transitory computer-readable medium comprising instructions which when executed by a processor cause a computer to perform a method comprising:

storing a plurality of models that perform time-series machine learning based on a plurality of different algorithms, respectively;

executing the plurality of models based on test data and determining accuracy values and interpretability toughness values for the plurality of models;

selecting a most accurate model from among the plurality of models as a core model based on the accuracy values and selecting a most interpretable model as a surrogate model from among other models remaining in the plurality of models as a surrogate model based on the interpretability toughness values;

building a composite model comprising the core model, the surrogate model, and instructions for generating a debrief model for debriefing the core model by combining a trend component and a seasonal component from the surrogate model with a residual component from the core model to generate the debrief model;

generating the debrief model, based on the instructions, by combining the trend component and the seasonal component from the surrogate model with the residual component from the core model;

executing the generated debrief model to determine variable contributions of each of a plurality of variables of one or more of the plurality of models;

initiating presentation of the determined variable contributions on a user interface; and storing the composite model within memory.

16. The non-transitory computer-readable medium of claim 15, wherein the method further comprises receiving a request to train the core model including an iteration of training data, and executing the core model based on the iteration of training data to generate a predicted output signal.

17. The non-transitory computer-readable medium of claim 16, wherein the method further comprises instantiating the debrief model, determining, via the debrief model, variable contributions of different components of the core model with respect to the predicted output signal, and displaying, via a user interface, signals of the variable contributions of the different components of the core model.

18. The non-transitory computer-readable medium of claim 15, wherein the building the composite model comprises building a file that comprises a first binary storage with the core model, a second binary storage with the surrogate model, and a header with instructions for building the debrief model from a combination of the core model and the surrogate model.

* * * * *